US006587211B1

(12) United States Patent
Gelbart

(10) Patent No.: US 6,587,211 B1
(45) Date of Patent: Jul. 1, 2003

(54) INTERFEROMETRIC TORQUE AND POWER SENSOR

(75) Inventor: Daniel Gelbart, Vancouver (CA)

(73) Assignee: Creo Srl, Holetown (BB)

(*) Notice: Subject to any disclaimer, the term of this patent is extended or adjusted under 35 U.S.C. 154(b) by 0 days.

(21) Appl. No.: 09/363,698

(22) Filed: Jul. 28, 1999

(51) Int. Cl.[7] ............................................. G01B 11/02
(52) U.S. Cl. ................................. 356/499; 356/35.5
(58) Field of Search ...................... 356/35.5, 498–499

(56) References Cited

U.S. PATENT DOCUMENTS

| 3,756,723 A | | 9/1973 | Hock .......................... 356/110 |
| 3,796,498 A | | 3/1974 | Post ............................. 356/169 |
| 3,891,321 A | | 6/1975 | Hock .......................... 356/111 |
| 4,525,068 A | | 6/1985 | Mannava et al. ........... 356/35.5 |
| 4,629,886 A | | 12/1986 | Akiyama et al. ............ 250/237 |
| 4,641,027 A | * | 2/1987 | Renner et al. ........... 250/237 G |
| 4,939,368 A | | 7/1990 | Brown ..................... 250/231.1 |
| 5,490,430 A | | 2/1996 | Anderson et al. ....... 73/862.324 |
| 5,734,108 A | * | 3/1998 | Walker et al. ................ 73/650 |
| 5,754,295 A | * | 5/1998 | Mitchell ..................... 356/356 |

FOREIGN PATENT DOCUMENTS

WO    WO99/09385    2/1999    ............. G01L/3/08

OTHER PUBLICATIONS

OPTRA data sheet, Jul. 21, 1999.
Canon data sheet, Jul. 21, 1999.

* cited by examiner

Primary Examiner—Frank G. Font
Assistant Examiner—Phil Natividad
(74) Attorney, Agent, or Firm—Oyen Wiggs Green & Mutala

(57) ABSTRACT

An interferometric optical torque sensor senses the torque transmitted by a rotating shaft without requiring physical contact with the shaft. A diffraction grating is provided on the shaft with its grating lines parallel to the longitudinal dimension of the shaft. A laser beam is split in two and reflected from two axially-separated points of the grating. As the shaft twists, the phase of the light in the diffracted orders of the light reflected from the grating changes. By superimposing the diffracted beams an interference pattern is created. The motion of the interference fringes in this pattern is proportional to the twist, therefore the torque, in the shaft. The power transmitted by the shaft may be computed from the torque and shaft speed.

19 Claims, 3 Drawing Sheets

INTERFEROMETRIC TORQUE AND POWER SENSOR

FIELD OF THE INVENTION

The invention relates to transducers, and particularly to non-contact optical torque sensing.

BACKGROUND ON THE INVENTION

In many applications of mechanical engineering, it is desired to measure strain or loads without physical contact. Whenever physical contact is permissible, a conventional electrical strain gauge is normally used. In some applications, such as sensing torque in a rotating shaft, physical contact is difficult and optical means of sensing torque may be utilized. Prior art non-contact, optical means for load and torque sensing have a low accuracy and a low sensitivity, particularly when the sensing device cannot be mounted sufficiently close to the object being measured. By using an interferometric principle with sub-cycle resolution, the present invention can measure movements below one nanometer from large distances, allowing accurate and sensitive load and torque measurement. The only part requiring contact with the object being measured is a label carrying an embossed diffraction grating. Such labels, being thin and light, do not affect the object being measured. The negligible mass of such a label, typically made of a thin plastic sheet, is particularly important when measuring torque in a rapidly rotating shaft, as any mass affecting the balancing of the shaft cannot be tolerated. This is particularly important in measuring torque in high-speed turbines and engines as well as miniature devices Interferometric principles have been used in shaft encoders, where motion of the grating creates a "beat" frequency (due to an optical Doppler effect) proportional to the surface velocity. In one embodiment of the present invention, this "beat" frequency is intentionally ignored and only the phase difference between two reflected beams is measured, thus the measured torque value is independent of the speed of rotation. One limitation of the prior art techniques, such as U.S. Pat. No. 4,525,068 ("Mannava") for example, is that they have limited measurement sensitivity, because they involve non-interferometric methods or interferometric methods only capable of counting an integer number of fringes. A second advantage of the invention over prior art is the ability to provide a very high sensitivity and a very wide torque measuring range in a single device, without requiring the generation of very high frequencies. These advantages allow the present invention to be used even at very high shaft speeds.

SUMMARY OF THE INVENTION

An interferometric optical torque sensor accurately senses the torque transmitted by a rotating shaft without requiring physical contact with the shaft. A thin flexible diffraction grating is bonded to the shaft with grating lines parallel to the shaft, A laser beam is split in two and reflected from two axially-separated points of the grating. As the shaft twists, the phase of the light in the diffracted orders of the light reflected from the grating will change. By superimposing the reflected beams, an interference pattern is created. The motion of the interference fringes in this pattern is proportional to the twist and, therefore, the torque in the shaft. The use of an interferometric principle allows high sensitivity. The use of collimated sensing beams allows a large gap between the sensing device and the shaft. The measured torque is independent of this gap and is independent of the rotational speed of the shaft. The power transmitted by the shaft may be computed from the torque and shaft speed.

DESCRIPTION OF THE PREFERRED EMBODIMENT

The invention measures torque by measuring the small twist caused in a shaft by applying torque. The twist is measured by interferometric methods having a resolution of a fraction of one cycle. Interferometric encoders, including sub-cycle resolution, are well known and detailed in U.S. Pat. Nos. 3,756,723; 3,796,496; 3,891,321 and 4,629,886. They are also commercially available from companies such as Canon (Internet address: www.usa.canon.com) and optra (Internet address: www.optra.com). No further details are given about these devices as they are well known and commonly used. When measuring twist in a rotating shaft, a simple interferometric encoder cannot be used, as the constant rotation of the shaft will cause a constant clock signal to appear at the encoder output. This problem is solved in U.S. Pat. No. 4,525,068 by accumulating (counting) the total number of clock pulses from two encoders. This limits the method to deal with an integer number of pulses, which in turn limits the resolution in measuring the torque, Non-interferometric methods, such as U.S. Pat. No. 5,490,430 and International Patent WO 99/09385 have even less resolution, as they are not using interferometric methods and have a short working distance.

Figure 1:
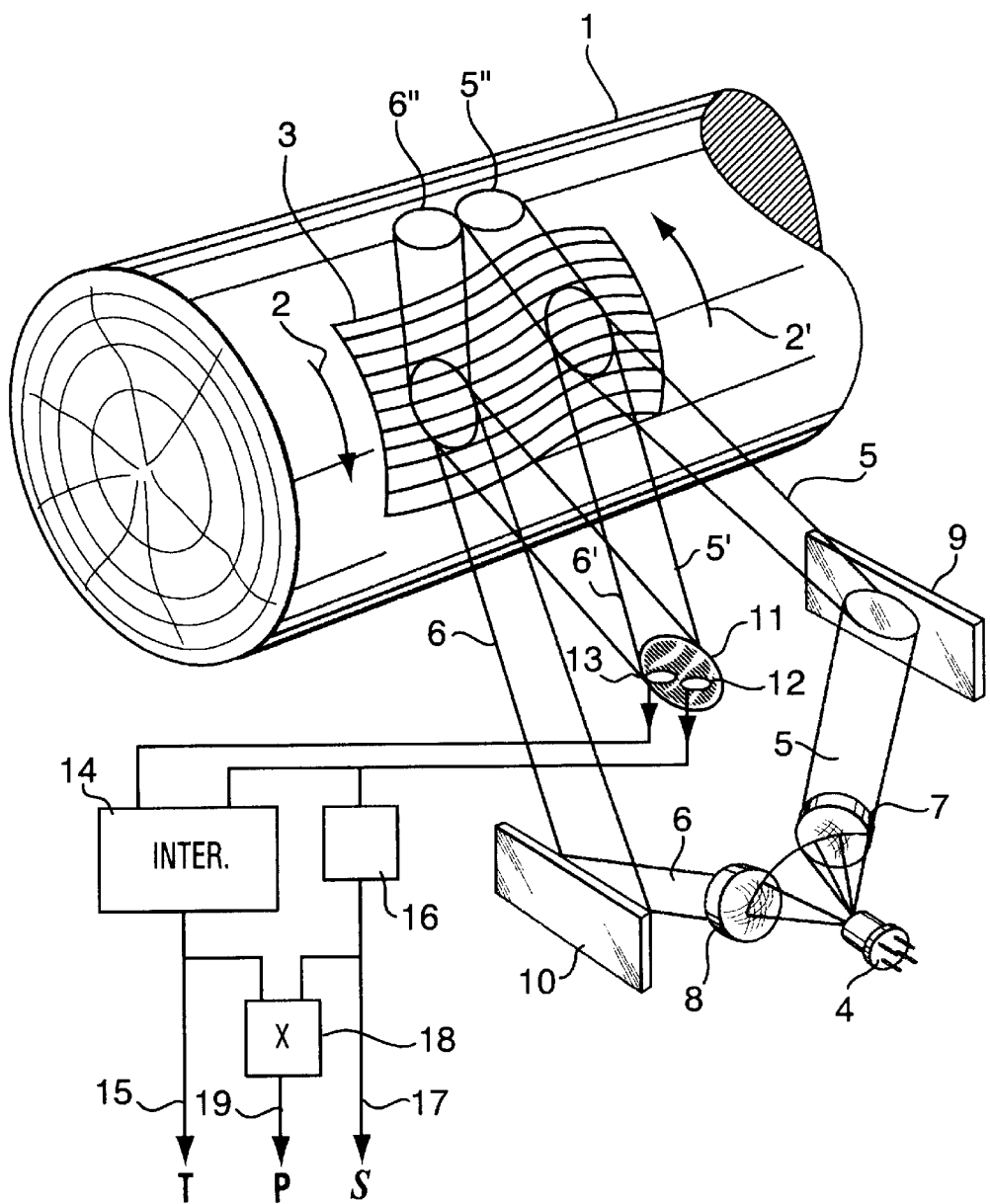
FIG. 1 is an isometric view of a torque and power sensor in accordance with a particular embodiment of the invention comprising an integrated sensor.
Figure 2:
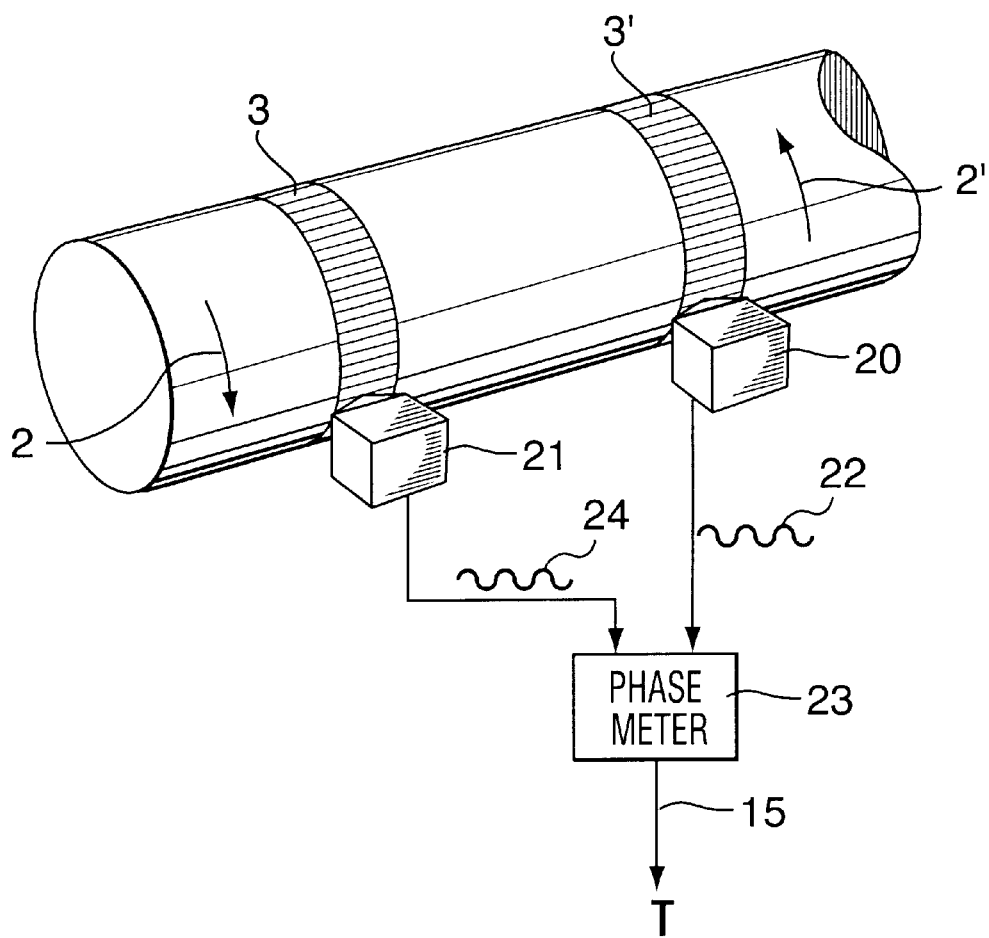
FIG. 2 is an isometric view of a torque and power sensor in accordance with a second embodiment of the invention comprising two separate sensing heads.
Figure 3:
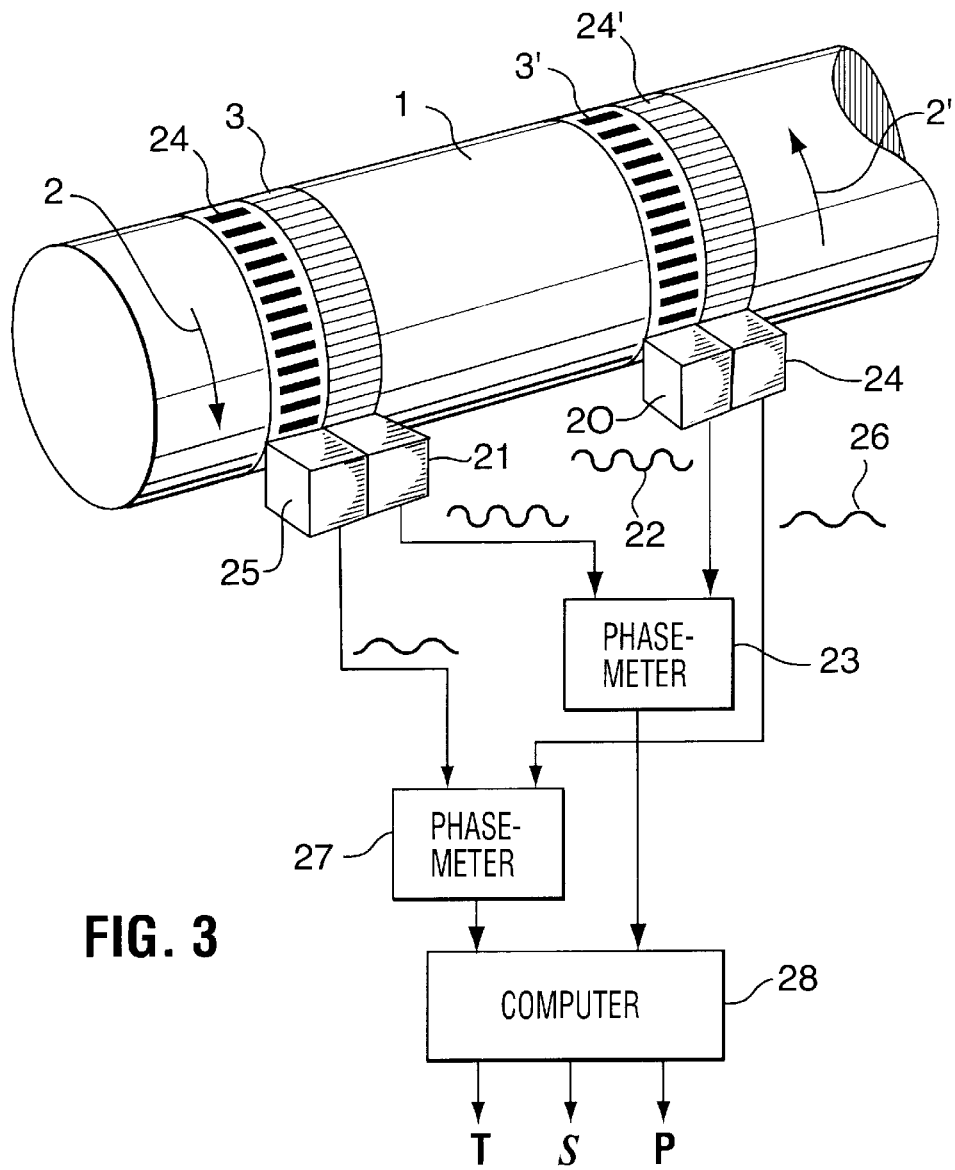
FIG. 3 is an isomeric view of a torque and power sensor in accordance with another embodiment of the invention which comprises different sensing for fine and coarse movements.

The present invention can be realized using an integrated interferometric encoder, optically combining the reflected light from two parts of a distorted grating, or by using two separate interferometric encoders and electronically measuring the phase difference between them. FIG. 1 represents the first approach, while FIG. 2 and FIG. 3 show the second. In both cases the phase of a waveform is being measured. In the integrated embodiment the waveform is generated optically before the phase is measured, while in the second embodiment both waveforms are electrical when the phase is measured.

Referring now to FIG. 1, a shaft 1 may be twisted due to torque caused by opposing forces 2 and 2'. A thin and flexible diffraction grating 3 is bonded to the shaft and is distorted by the twist in the shaft. Grating 3 is typically made by replication and can have a pressure-sensitive adhesive backing, similar to "rainbow" effect decorative labels. No particular accuracy is required from grating 3. The output of light source 4, preferably a single-mode laser diode, is divided into two beams 5 and 6 by collimating lenses 7 and 8. Beams 5 and 6 are reflected by mirrors 9 and 10 and are directed toward shaft 1, where they are diffracted by grating 6C Beam 5 is diffracted into positive and negative first order beams 5' and 5", while beam 6 is similarly diffracted into positive and negative first order beams 6' and 6". FIG. 1 shows only the first order beams; however, higher orders normally exist as well and can be utilized by the invention. Mirrors 9 and 10 are adjusted such that positive first order beams 5' and 6' overlap in a common region, causing interference fringes 11 in the overlapping region. Since the optical path length of beams 5+5' is equal to that of beams 6+6', light source 4 does not need to have a long coherence length and even multi-mode laser diodes, and in some cases even Light Emitting Diodes (LED) will produce high contrast fringes. Fringes 11 will move as shaft 1 is twisted, as the part of grating 3 illuminated by beam 5 moves relative to the part of grating 3 illuminated by beam 6. If shaft 1 is rotating instead of stationary, the period of interference fringes 11 (and thus the operation of the sensor) is not affected. Reflected first order diffraction beams 5' and 6' will both be similarly wavelength shifted by the Doppler effect. Thus, by measuring the movement of the fringes 11 caused by interference of the two first order diffraction beams 5' and 6' from different regions of shaft 1, the sensor of the present invention avoids having to deal with any high frequencies caused by the rotation of shaft 1. Detection of the movement of fringes 11 involves detection of a waveform representing only the torque, and not the rotation, in shaft 1.

Fringes 11 are measured by a pair of photodiodes 12 and 13 which are offset to have the outputs at 90° phase shift ("quadrature") from one another. An alternate way to achieve quadrature is to use circularly polarized light and a polarizing beam splitter, exposing each of photodiodes 12 and 13 to orthogonal polarization. The outputs of diodes 12 and 13, which are approximately sinusoidal as shaft 1 twists, can be interpolated to a resolution much higher than a single cycle by using a commercially available interpolator, such as the Optra Nano Scale Model A Dual Axis Processor (Internet address; www.Optra.com). Resolutions down to 0.01 of a cycle are available By way of example, if shaft 1 is 100 mm in diameter and grating 3 has 1000 lines/mm, one cycle of photodiode 12 will correspond to a twist of one micron. After interpolation a twist of 10 nm can be measured, representing an angle of 10 nm:50 mm=0.2 microradians. The output 15 of interpolator 14 is proportional to the torque in shaft 1. Besides measuring the torque, the same unit can measure rotational speed of shaft 1 and power transmitted through shaft 1. By counting the number of bursts of fringes per unit time, counter 16 outputs the rotational speed S as output 17. By multiplying the torque T (output 15) by speed S (output 17) in multiplier 18, an output 19 representative of the transmitted power P is created.

The difference between diffracted order beams 5' and 6' need not be measured optically. Each diffracted order beam 5' and 6' can be made to interfere with the reference beam (i.e. 5' interfering with 5, and 6' with 6) or with other orders 5" and 6", and the differences between the fringes can be measured electronically. In such an embodiment, each optical unit can be an off-the-shelf interferometric reading head. Such an implementation is shown in FIG. 2. In the preferred embodiment of FIG. 2 interferometric reading heads 20, 21 may be commercially available interferometric reading heads, such as Canon Micro Linear Encoder Head (from Canon, Internet address www.usa.canon.com) or Optra Nano Scale Model A (from Optra, Internet address www.optra.com). The latter has a resolution of 0.3 nm with a relatively coarse pitch of 10 microns in grating 3 and 3'. A phasemeter 23 measures the phase difference between the outputs of reading heads 20 and 21. An alternate approach, allowing much higher rotational speeds, is to use non-interpolated reading heads, having sinusoidal outputs 22 and 24 fed to a precision phasemeter 23 capable of resolving better than 0.01° of phase separation. Such phasemeters are well known and are commercially available. (For example, Wavetek Model 775 or Krohn-Hite Model 6620). A 0.01° resolution on a 10 micron pitch grating is equal to 10 micron: 360×100=10 micron: 36000=0.3 nm. Using the same 100 mm diameter shaft, this resolution corresponds to a twist of 0.3 nm:50 mm=0.006 microradians. This is a much higher resolution than any prior art method, and it is measured at a very high rotational speed. For example, using the previous 10 micron grating, there are about 31,400 lines around the shaft (100 mm×Π×100 lines/mm). Since phasemeter 23 can easily measure up to 1 MHz, this is a rotational speed of over 30 Hz, or 1,800 RPM, with a measuring sensitivity of 0.006 microradians. In the embodiment of FIG. 2, the frequency of sinewaves 22 and 24 is changing as the rotational speed of shaft 1 is changing, however the phase angle between them is only a function of the twist or torque in shaft 1 and is unaffected by the rotation. This is essential to be able to measure torque independent of speed. Even a higher resolution, down to 0.001° or 0.03 nm can be achieved by using a digital signal analyzer as a phasemeter. For example, Hewlett-Packard model 35665A Signal Analyzer resolves 0.001°.

For a larger range of torques, the phase angle between sinewaves 22, 24 can exceed 360°, resulting in ambiguity. The ambiguity can be resolved by: (i) counting cycles if measurements are allowed to start from zero, or (ii) having a fine/coarse scale arrangement as shown in FIG. 3. The advantage of the embodiment of FIG. 3 is that the reading is absolute, not relative. This is important in applications where readings may have to be intermittent or interrupted, without being able to start from zero torque. Referring now to FIG. 3, coarse scales 24 and 24' are added to fine scales 3 and 3'. A second set of reading heads, 24 and 25, are added to reading heads 20 and 21, and a second phasemeter 27 is added, for coarse position measurement. The computer 28 uses the coarse phase output of phasemeter 27 to derive the most significant digits of the torque (T), speed (S) and power (P) and the fine phase output of phasemeter 23 for the least significant digits of a, S and P. For example, it the pitch of scale 24 is 100 times the pitch of scale 3, each cycle of scale 3 represents 3.6° in scale 24. Using a phasemeter with 1° accuracy, it is easy to tell how many complete cycles of scale 3 have been shifted by the twist of the shaft. Once the cycle number is known, the position within the cycle is determined by the fine pitch phasemeter 23. If each phasemeter 23, 27 can measure to 0.01° (i.e. dynamic range of 360:0.01°= 36000) the total theoretical dynamic range of the system is 36000×36000=1.296×10$^9$. This requires that the pitch of the coarse grating 24, 24' is 36,000 times larger than the fine grating 3, 3', which is not always practical. By way of example, if the pitch of the fine grating 3, 3' is 1 micron and the pitch of the coarse grating 24, 24' is 1 mm, the total dynamic range is 1000×36000=36,000,000. Such a large dynamic range coupled with a sub-microradian sensitivity cannot be achieved by any of the prior art methods.

Figure 4:
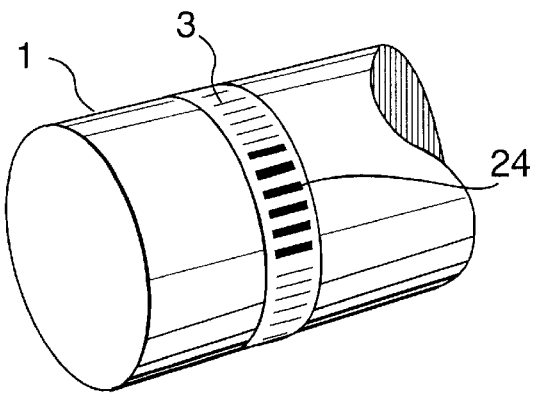
FIG. 4 is an alternate embodiment of a grating which may be used for fine and coarse sensing.

For applications not requiring continuous torque readout, the embodiment shown in FIG. 3 can be simplified by using a grating combining coarse resolution 24 and fine resolution 3 in a single grating, thus requiring only a single sensing head for each part of the shaft. This is shown in FIG. 4. If this type of grating is used in FIG. 3, only reading heads 20, 21 and phasemeter 23 are required. Computer 28 will receive, sequentially, the coarse and fine information and compute the total twist without ambiguity. The only drawback is the short gaps in measuring torque when sensing heads scan the coarse part of the grating.

What is claimed is:

1. A method for measuring a torque in a shaft, the method comprising:
   providing a diffraction grating on said shaft, wherein when said shaft is twisted by said torque, a relative displacement is produced between areas of said grating that are spaced apart from one another along a longitudinal dimension of the shaft;
   illuminating a plurality of said spaced apart areas of said grating and creating an optical interference pattern by overlapping light diffracted from each of said spaced apart areas; and,
   determining said torque from said interference pattern using at least one light detector.

2. A method as in claim 1, comprising increasing a resolution of said light detector using an electronic interpolator.

3. A method for determining a twist of a shaft, the method comprising:
   directing a first incident coherent radiation beam at a first region on a surface of the shaft, the first incident radiation beam producing a first diffracted output beam;
   directing a second incident coherent radiation beam at a second region on the surface of the shaft wherein the second region is spaced apart from the first region along a longitudinal dimension of the shaft, the second incident radiation beam producing a second diffracted output beam;
   generating an interference pattern in a region of space by overlapping the first and second diffracted output beams; and,
   measuring an optical intensity of at least a portion of the interference pattern and based on the measured optical intensity determining a value indicative of the twist of the shaft.

4. A method according to claim 3 comprising generating the first and second incident radiation beams by splitting radiation from a radiation source to form the first and second incident radiation beams.

5. A method according to claim 4 comprising:
   providing a diffraction grating on the shaft, the diffraction grating extending between the first and second regions;
   directing the first incident radiation beam at a first region of the diffraction grating to produce the first diffracted output beam; and,
   directing the second incident radiation beam at a second region of the diffraction grating to produce the second diffracted output beam.

6. A method according to claim 3 comprising providing a diffraction grating on the surface of the shaft, the diffraction grating extending between the first and second regions, wherein when the shaft is twisted by an applied torque, a portion of the diffraction grating in the first region is displaced angularly relative to a portion of the diffraction grating in the second region.

7. A method according to claim 6, wherein the diffraction grating comprises grating lines oriented substantially parallel to the longitudinal dimension of the shaft.

8. A method according to claim 6, wherein providing a diffraction grating on the shaft comprises adhesively affixing the diffraction grating to the shaft.

9. A method according to claim 3 comprising providing a first diffraction grating on the shaft in the first region, and a second diffraction grating on the shaft in the second region, wherein when the shaft is twisted by an applied torque, the first diffraction grating is displaced angularly relative to the second diffraction grating.

10. A method according to claim 9, wherein the first and second diffraction gratings comprise grating lines oriented substantially parallel to the longitudinal dimension of the shaft.

11. A method according to claim 3, wherein measuring an optical intensity of at least a portion of the interference pattern comprises generating two electronic signals, each of which is representative of the optical intensity of the interference pattern at a particular location, the two electronic signals being separated in phase from one another.

12. A method according to claim 11, wherein the phase separation between the two electronic signals is 90 degrees.

13. A method according to claim 11, wherein generating two electronic signals comprises measuring an optical intensity of the interference pattern at a first location using a first photodetector and measuring an optical intensity of the interference pattern at a second location using a second photodetector.

14. A method according to claim 13, comprising generating the interference pattern while the shaft is rotating about an axis that is substantially parallel to its longitudinal dimension and determining a rotational speed of the shaft based upon one or more of the optical intensities measured at the first and second locations.

15. A method according to claim 14 comprising determining a power transmitted by rotation of the shaft based upon the rotational speed of the shaft and a torque applied to the shaft.

16. A method according to claim 11, comprising resolving a movement of the interference pattern to within a fraction of a period of the interference pattern by interpolating the two electronic signals.

17. A method according to claim 3, comprising generating the interference pattern while the shaft is rotating about an axis that is substantially parallel to its longitudinal dimension.

18. A method according to claim 17 comprising determining a torque applied to the shaft based on the twist of the shaft.

19. An apparatus for determining the twist of a shaft, the apparatus comprising:
   at least one radiation source;
   an optical system configured to receive radiation from the at least one radiation source and to direct a first incident radiation beam at a first region of the shaft and a second incident radiation beam at a second region of the shaft, the second region spaced apart from the first region along a longitudinal dimension of the shaft;
   one or more diffraction gratings on the shaft, the diffraction gratings positioned to produce a first diffracted beam in response to the first incident radiation beam and to produce a second diffracted beam in response to the second incident radiation beam wherein the first and second diffracted beams overlap with one another to create an optical interference pattern; and,
   at least one radiation detector, positioned to measure an optical intensity of at least a portion of the interference pattern.

* * * * *